(12) United States Patent
Suk

(10) Patent No.: US 7,236,330 B2
(45) Date of Patent: Jun. 26, 2007

(54) DISK HEAD STABILITY SYSTEM

(75) Inventor: Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 372 days.

(21) Appl. No.: 10/777,533

(22) Filed: Feb. 11, 2004

(65) Prior Publication Data

US 2005/0174695 A1 Aug. 11, 2005

(51) Int. Cl.
*G11B 5/60* (2006.01)

(52) U.S. Cl. .................................. 360/245.7

(58) Field of Classification Search ............. 360/245.7
See application file for complete search history.

(56) References Cited

U.S. PATENT DOCUMENTS

| | | | |
|---|---|---|---|
| 4,703,470 A | 10/1987 | Castagna et al. ........... 369/215 |
| 5,771,135 A * | 6/1998 | Ruiz et al. ................ 360/244.3 |
| 5,940,251 A | 8/1999 | Giere et al. .................. 360/104 |
| 5,943,191 A | 8/1999 | Giere et al. .................. 360/104 |
| 6,751,062 B2 * | 6/2004 | Kasajima et al. ......... 360/234.6 |
| 6,771,466 B2 * | 8/2004 | Kasajima et al. ......... 360/234.6 |
| 2002/0141114 A1 | 10/2002 | Wittig et al. ............. 360/244.9 |
| 2003/0081356 A1 | 5/2003 | Shimizu et al. .......... 360/265.9 |

\* cited by examiner

*Primary Examiner*—Hoa T. Nguyen
*Assistant Examiner*—Mark Blouin
(74) *Attorney, Agent, or Firm*—Zikla-Kotab, PC

(57) ABSTRACT

A slider assembly, comprising a slider having a magnetic head for reading and/or writing to a storage medium, and a vibration absorber operatively coupled to the slider for reducing mechanical vibrations of the slider caused by contact of the slider with the storage medium. The vibration absorber preferably includes a coupling portion coupled to the slider, and a weight coupled to the coupling portion by a resiliently deformable (e.g., flexible or elastic) member.

32 Claims, 14 Drawing Sheets

DISK HEAD STABILITY SYSTEM

FIELD OF THE INVENTION

The present invention relates to reliability devices for disk drives, and more particularly, this invention relates to a disk head with reduced off-track motion and vertical oscillation of the slider.

BACKGROUND OF THE INVENTION

In a disk drive, a magnetic recording head is made of read and write elements. The write element is used to record and erase data bits arranged in circular tracks on the disk while the read element plays back a recorded magnetic signal. The magnetic recording head is mounted on a slider which is connected to a suspension arm, the suspension arm urging the slider toward a magnetic storage disk. When the disk is rotated the slider flies above the surface of the disk on a cushion of air which is generated by the rotating disk.

The read element is generally made of a small stripe of multilayer magnetic thin films which have either magnetoresistance (MR) effect or giant magnetoresistance (GMR) effect, namely which changes resistance in response to a magnetic field change such as magnetic flux incursions (bits) from magnetic storage disk. Recorded data can be read from a magnetic medium because the external magnetic field from the recorded medium (the signal field) applies a change in the direction of magnetization in the read element, which in turn causes a change in resistance in the read element and a corresponding change in the sensed current or voltage.

As recording density and data transfer rate have increased over the past a few years, critical dimensions in the recording device such as track width, read sensor, write gap and coil size have decreased accordingly. Also, the spacing between the air bearing surface (ABS) and the media have become smaller and smaller. For reference, recording heads with 40 gb/in$^2$ products typically have fly heights of about 12 nanometers. This fly height will continue to decrease in the future. This reduction in head critical dimensions and fly height, while beneficial to magnetic performance, also comes with cost on thermal and mechanic reliability.

There are several factors that have until now limited the reduction in slider flying height. These factors might reasonably be ignored at flying heights of above 20 nanometers, but would become major concerns at flying heights on the order of <10 nanometers. These include variations in the sliders themselves, variations in the structure that supports the sliders, and media surface roughness.

Of particular concern is the instability caused by disk-head contact, which is more frequent at lower slider flying heights, but can occur at nearly any fly height nonetheless. While new processes are ever making disk surfaces smoother and smoother, disks inherently have asperities. When the slider contacts these asperities, the impact can cause an off-track motion and/or vertical oscillations, resulting in misreads, data overwrites, and failure to write properly.

At lower fly heights, disk waviness may also cause head-disk contact induced off-track motion and/or vertical oscillations. To ensure that the head remains properly aligned with the data tracks, the disks must be securely attached to the spindle. Current practice is to separate the disks in the stack with spacer rings, and position a spacer ring on top of the disk/spacer stack. Then a top ring with several apertures is placed over the top spacer ring. The disks are bolted to the spindle via bolts extending through the apertures in the top ring. Great pressure must be exerted by the bolts on the top ring in order to prevent slippage of the disks in the event that the drive is bumped or uneven thermal expansion breaks the frictional coupling, because once the disks slip, the drive loses its servo and the data may not be readable.

A major drawback of the current practice is that when the bolts are tightened, the top ring and spacer become deformed due to the uneven pressures exerted by the individual bolts. Disks are typically formed from aluminum or glass. Aluminum is more easily deformed, so any external stress can cause deformations to the disk. Glass, too, will deform under uneven stress patterns. The deformation translates out to the disk, creating an uneven "wavy" disk surface, which is most prominent at the inner diameter of the disk.

Further, it has been found that stresses induced on the top disk in the stack transfer down into some or all of the remaining disks in the stack, causing the remaining disks in the drive to show similar unevenness.

Thus, the clearance between the slider and the disk is limited by the curvature of the disk, which is more pronounced towards the inner diameter due to clamping. To avoid interfering with the disk at the inner diameter, the slider is usually designed to fly higher to compensate for the curvature at the inner diameter of the disk. This curvature then translates into an increase in the magnetic signal variation.

Normal tolerances in slider fabrication lead to structural variations among the sliders in any given batch. Consequently, the flying heights of sliders in the batch are distributed over a range, although the flying height of each slider individually is substantially constant. Thus, some sliders will be more prone to intermittent contact with the disk surface.

Variations in supporting structures occur primarily in the transducer support arm, the suspension or gimbal structure, slider geometry and load arm. These variations influence the flying height, and the nature of a given slider's reaction to any disturbances, e.g. due to shock or vibration.

Thermal protrusion of the head also contributes to more frequent head-disk contact. FIGS. 1 and 2A–2C illustrate examples of a conventional composite type thin-film magnetic head 10. FIG. 1 is a cross-sectional view of the head 10 perpendicular to the plane of the air bearing surface (ABS). FIG. 2A shows the slider 11 flying above the disk 13.

In these figures, the reference numeral 12 denotes a substrate, 15 denotes an undercoating, 20 denotes a lower shield layer of the MR reproducing head part, 21 denotes an upper shield layer of the MR head part, which can also act as a lower pole of an inductive recording head part, 22 denotes a MR layer provided through an insulating layer 23 between the lower shield layer 20 and the upper shield layer 21, 26 denotes a write gap layer, 27 denotes a lower insulating layer deposited on the upper shield layer 21, 28 denotes a coil conductor formed on the lower insulating layer 27, 29 denotes an upper insulating layer deposited so as to cover the coil conductor 28, 30 denotes an upper pole, and 34 denotes a pad that would connect the read or write coil to other components in the drive. In general, there would be a plurality of pads 34 on the slider 11. Note that the pad 34 connects directly to the coil conductor 28. The upper pole 30 is magnetically connected with the lower pole (upper shield layer) 21 at its rear portion so as to constitute a magnetic yoke together with the lower pole 21.

The thermal expansion coefficients for the substrate and the various layers of the head differ, so when the head becomes heated during use, some layers will begin to protrude from the ABS. FIG. 2B depicts the head 10 when the write element is not operating, and particularly that the spacing may vary due to recession of various materials and structure due to the ABS fabrication process. FIG. 2C is a detailed diagram of the heat transfer and protrusion profile of the head 10 when the head is active (e.g., when the write coil is energized). One issue with heads is that the write-induced protrusion of the pole and overcoat can cause head-media contact, resulting in errors. This can affect the write head signal to noise ratio with alterations in the magnetic spacing between the head and the media. In older generations of heads, this was not a problem because the head was flying much higher and device size was bigger leading to easier heat dissipation. However, the coil length in modern heads has decreased to accommodate high data rate advancement. Consequently, Joule heating from the write current through coil and eddy current in write pole/yoke and magnetic hysteresis of magnetic materials are confined in a tiny space near the ABS, which typically lead to unacceptable thermal protrusion and the drive reliability concerns mentioned above. As can be seen in FIG. 2C, the top write pole 30 and overcoat protrude from the ABS 32 toward the media 13. The protrusion amount is typically 1–4 nanometers.

One proposed design of a slider would drag on the disk surface, thereby more precisely fixing a head/disk spacing based on a peak roughness of the disk surface. Any improvement in setting the transducer/recording surface gap, however, would be at the cost of excessive wear to the slider, media recording surface, or both.

What is needed is a way to reduce off-track motion and vertical vibration caused by slider-disk contact, thereby reducing errors, reducing read and write signal variations caused by the varying flying height, and allowing the slider to be in close proximity to the media during reading and/or writing for allowing the heads to read and write with reduced track width, bit length and error rate.

SUMMARY OF THE INVENTION

The present invention includes a slider assembly, comprising a slider having a magnetic head for reading and/or writing to a storage medium, and a tuned vibration absorber operatively coupled to the slider for reducing mechanical vibrations of the slider caused by contact of the slider with the storage medium. The vibration absorber preferably includes a coupling portion coupled to the slider, and a weight coupled to the coupling portion by a resiliently deformable (e.g., flexible or elastic) member.

The weight is preferably positioned towards a trailing edge of the slider, but can be positioned towards the leading edge of the slider. In other embodiments, the assembly includes a second weight coupled to the coupling portion of the vibration absorber. In these embodiments, the first and second weights can be positioned towards the leading and trailing edge of the slider respectively, towards edges of the slider extending between the trailing and leading edges of the slider, or combinations thereof.

The vibration absorber is preferably tuned to match a natural frequency of vibration of the slider when the slider is in a flying state—here the vibration of the slider is to mean that the slider is moving laterally or longitudinally with respect to the disk surface. The vibration absorber can also be damped if desired, and if so, the damped vibration absorber should be tuned to a frequency slightly lower than the desired natural frequency of vibration of the slider when the slider is in a flying state.

The slider assembly can be incorporated into a magnetic storage system having a magnetic disk, an actuator arm and suspension for supporting the slider, and a control unit coupled to the head for controlling operation of the head. The vibration absorber can be coupled to the slider or to the flexure. Furthermore, the vibration absorber can be made as an integral part of the flexure.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
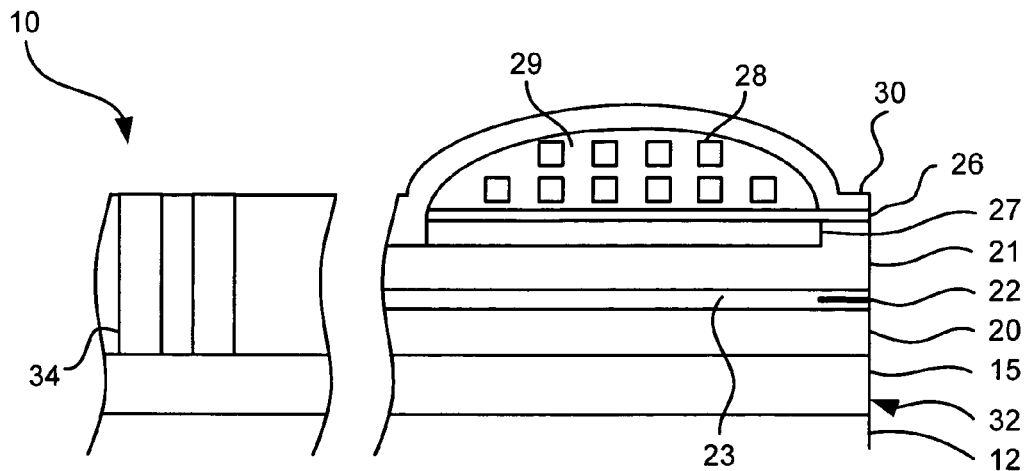
FIG. 1 is a cross-sectional view of a conventional composite type magnetic head, perpendicular to the plane of the ABS.
Figure 2A:
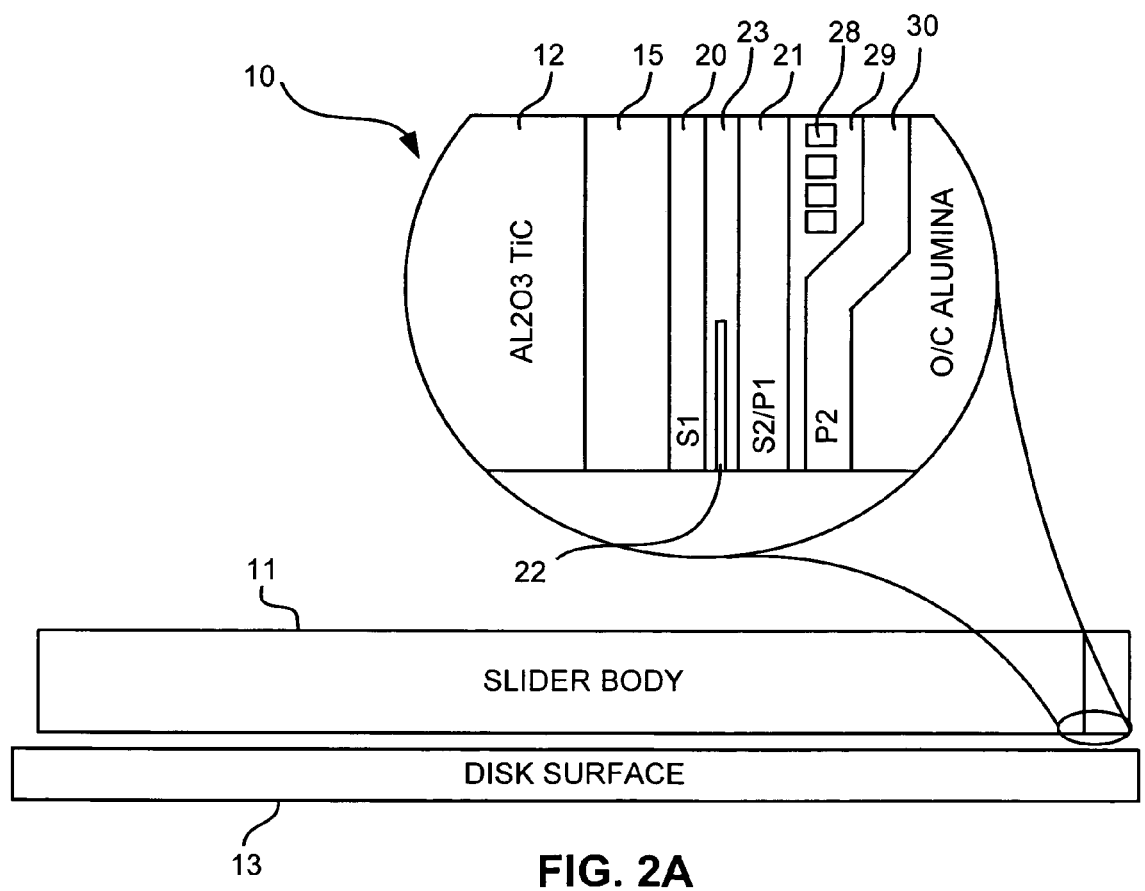
FIG. 2A shows a cold slider flying above the disk.
Figure 2B:
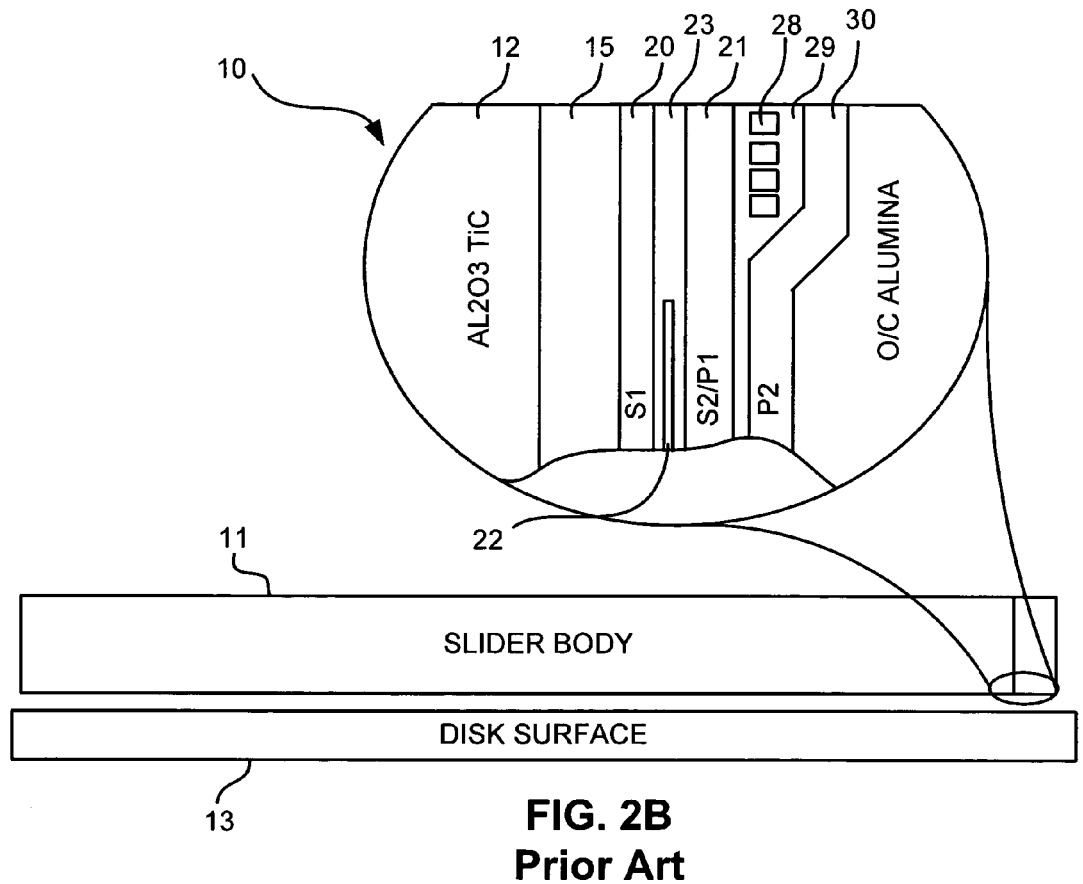
FIG. 2B depicts the discontinuity of a head caused by recession of various materials and structure due to the ABS fabrication process.
Figure 2C:
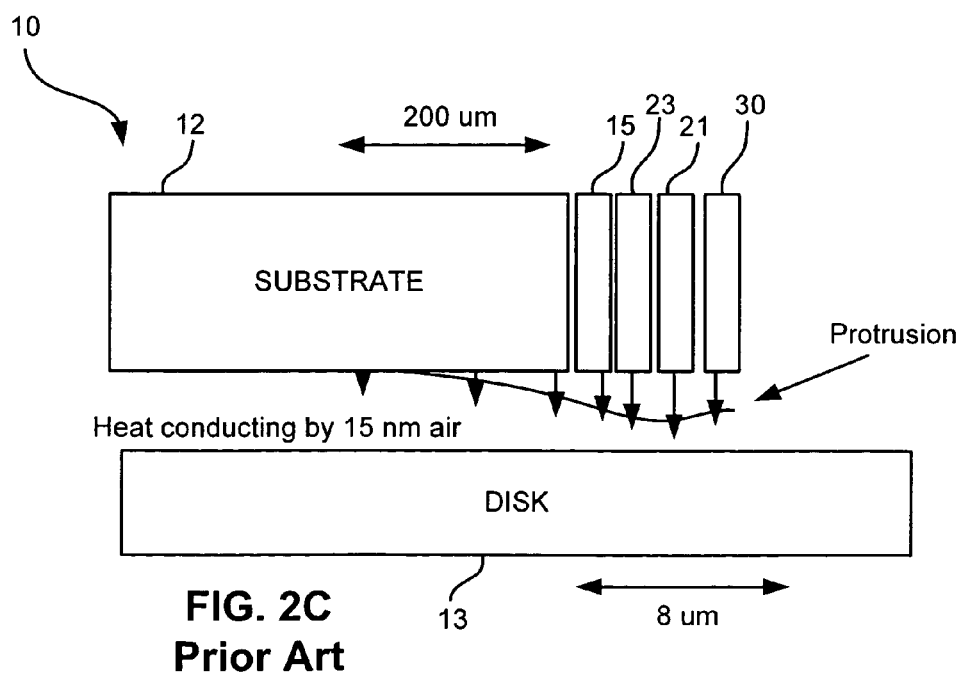
FIG. 2C is a detailed diagram of the heat transfer profile and protrusion profile of a head.
Figure 3:
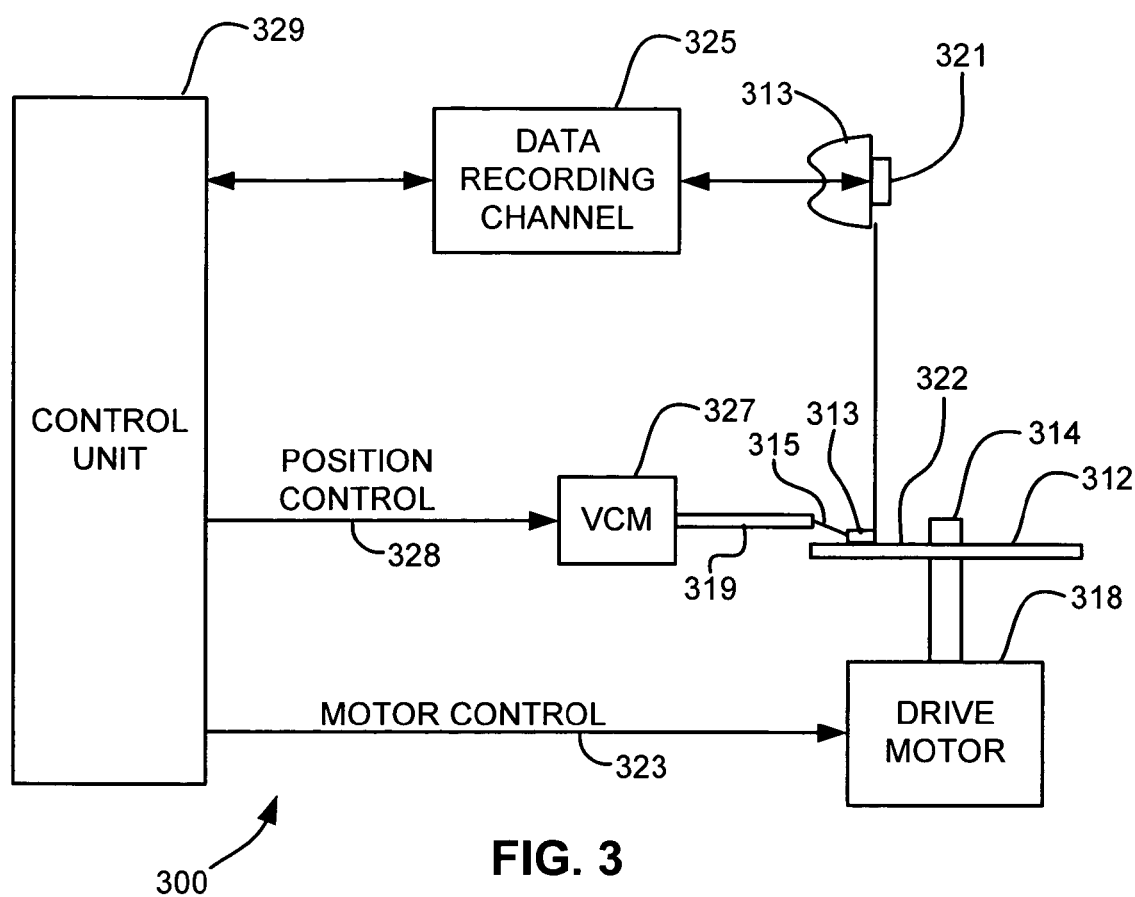
FIG. 3 is a simplified diagram of a magnetic disk drive system in accordance with one embodiment.

Referring now to FIGS. 3–8, there is shown a disk drive 300 embodying the present invention. As shown in FIG. 3, at least one rotatable magnetic disk 312 acts as the storage medium and is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIGS. 5, 7 and 8. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 towards the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
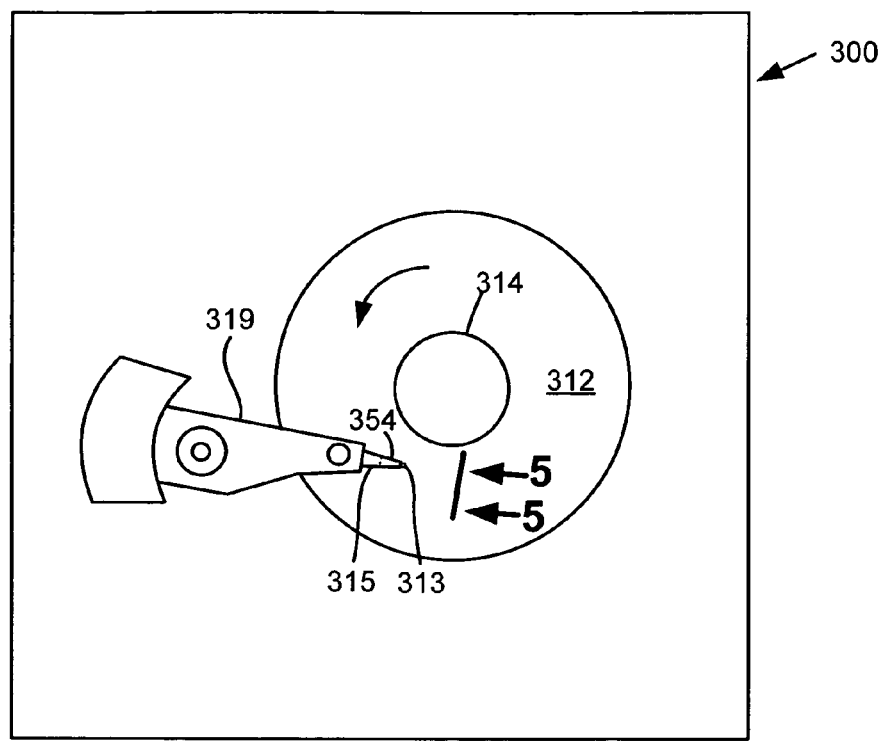
FIG. 4 is a planar view of an exemplary magnetic disk drive.
Figure 5:
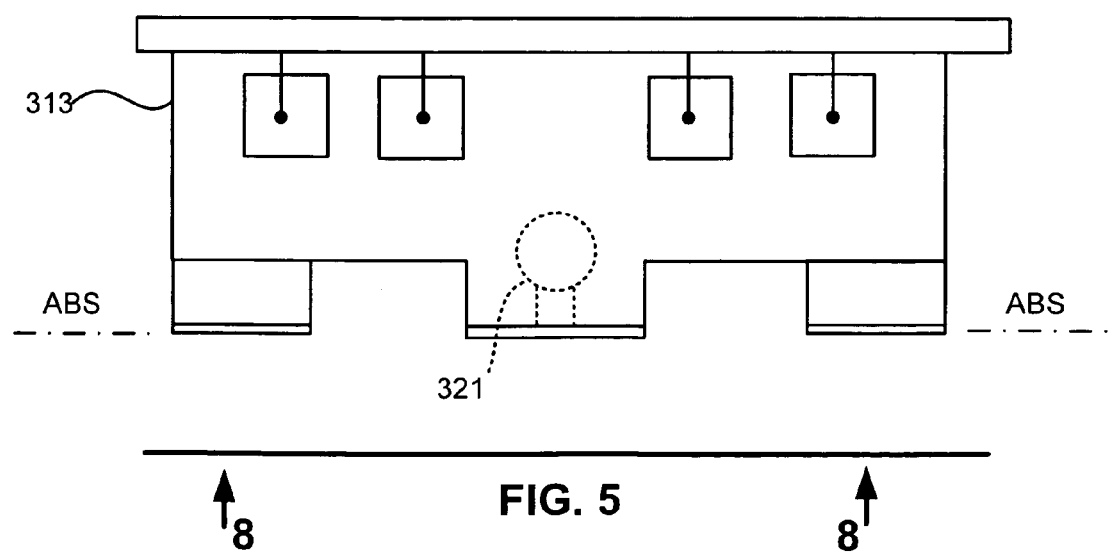
FIG. 5 is an end view of a slider with a magnetic head of the disk drive as seen in plane 5—5.
Figure 6:
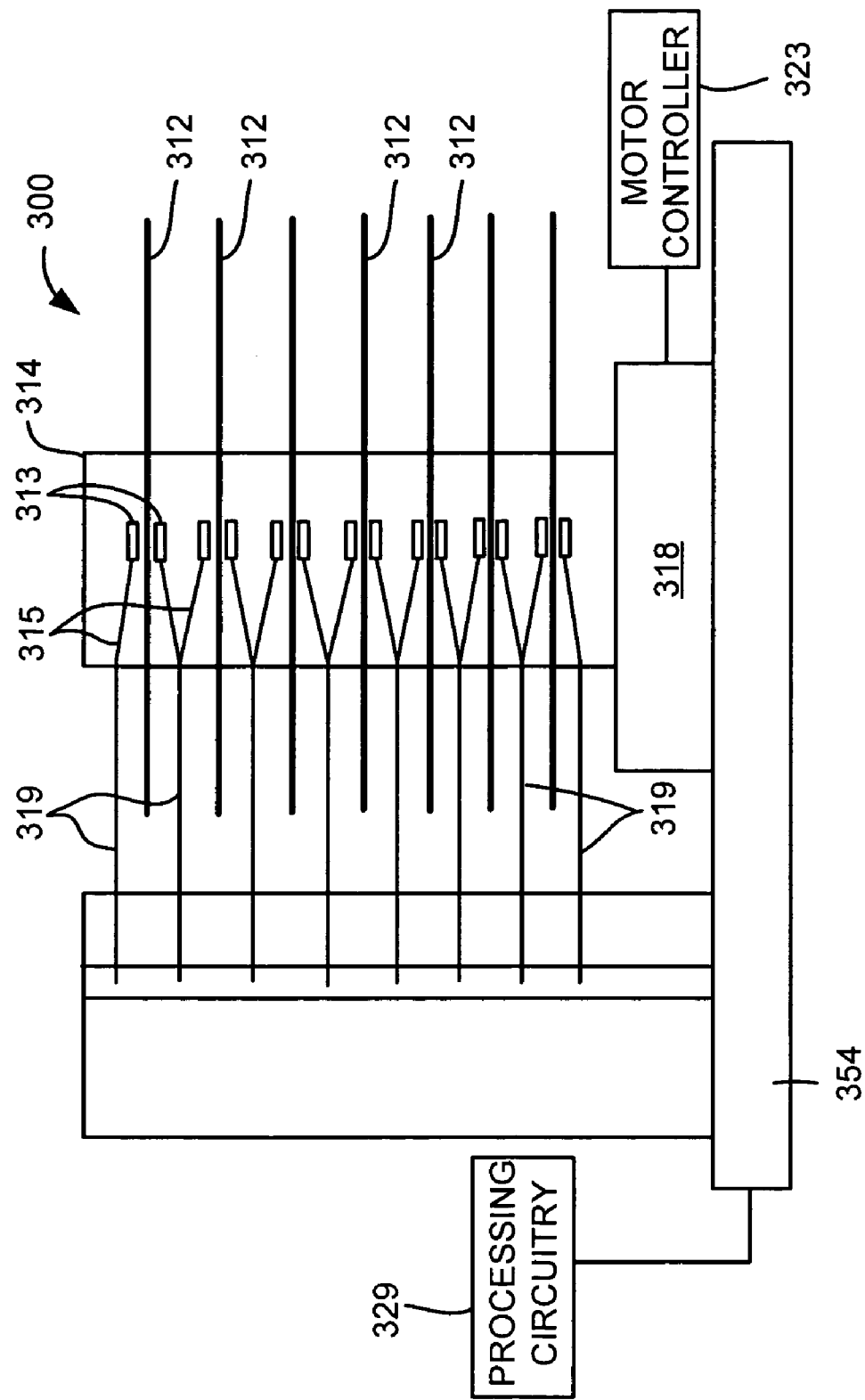
FIG. 6 is an elevation view of the magnetic disk drive wherein multiple disks and magnetic heads are employed.
Figure 7:
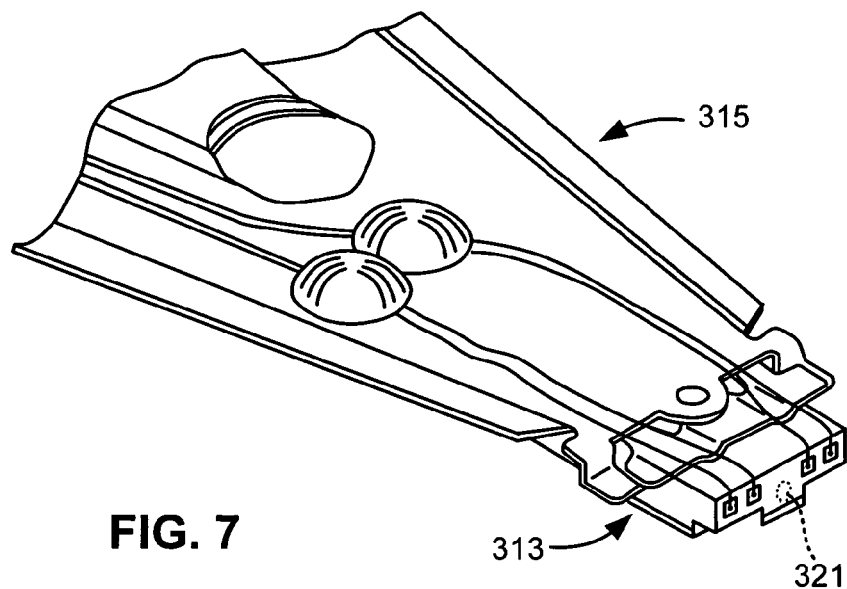
FIG. 7 is an isometric illustration of an exemplary suspension system for supporting the slider and magnetic head.

FIG. 4 shows a physical view of the drive 300. The drive 300 includes a spindle 314 that supports and rotates a magnetic disk 312. A combined read and write magnetic head 321 is mounted on a slider 313 that is supported by a suspension 315 and actuator arm 319. A plurality of disks, sliders and suspensions may be employed in a large capacity Direct Access Storage Device (DASD) as shown in FIG. 6. The suspension 315 and actuator arm 319 position the slider 313 so that the magnetic head 321 is in a transducing relationship with a surface of the magnetic disk 312. In FIG. 7 the slider 313 is shown mounted to the suspension 315. The components described hereinabove may be mounted on a frame 354, as shown in FIG. 6.

Figure 8:
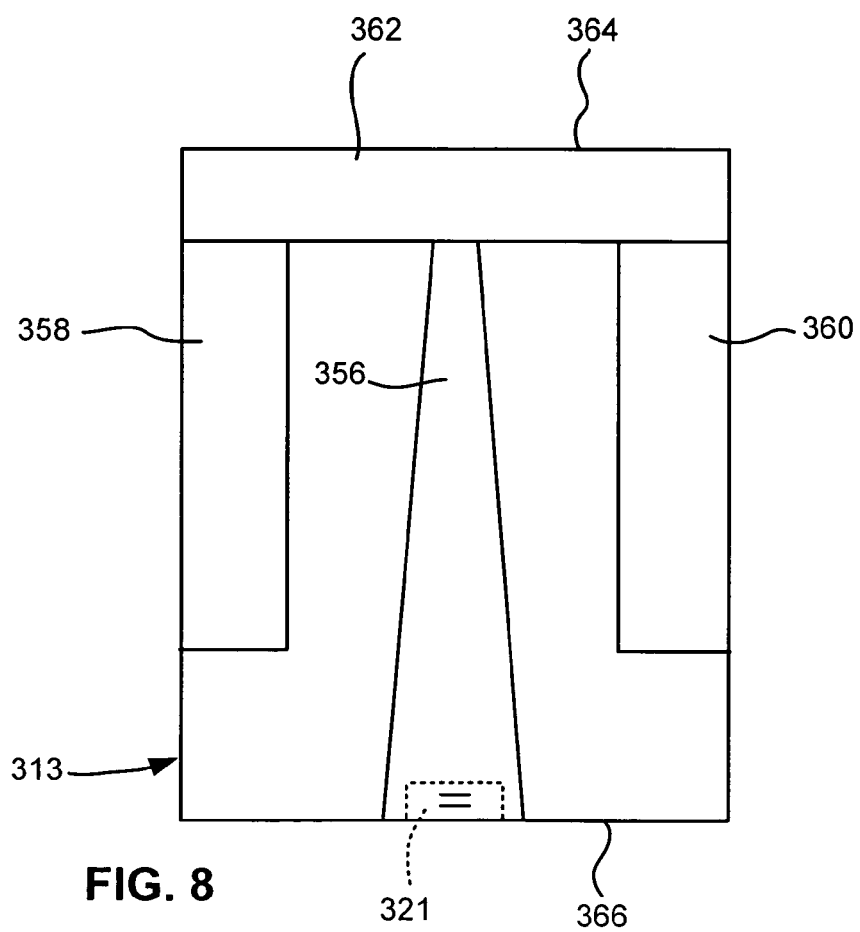
FIG. 8 is an ABS view of the magnetic head taken along plane 8—8 of FIG. 5.

FIG. 8 is an ABS view of the slider 313 and the magnetic head 321. The slider has a center rail 356 that supports the magnetic head 321, and side rails 358 and 360. The rails 356, 358 and 360 extend from a cross rail 362. With respect to rotation of the magnetic disk 312, the cross rail 362 is at a leading edge 364 of the slider and the magnetic head 321 is at a trailing edge 366 of the slider.

Figure 9A:
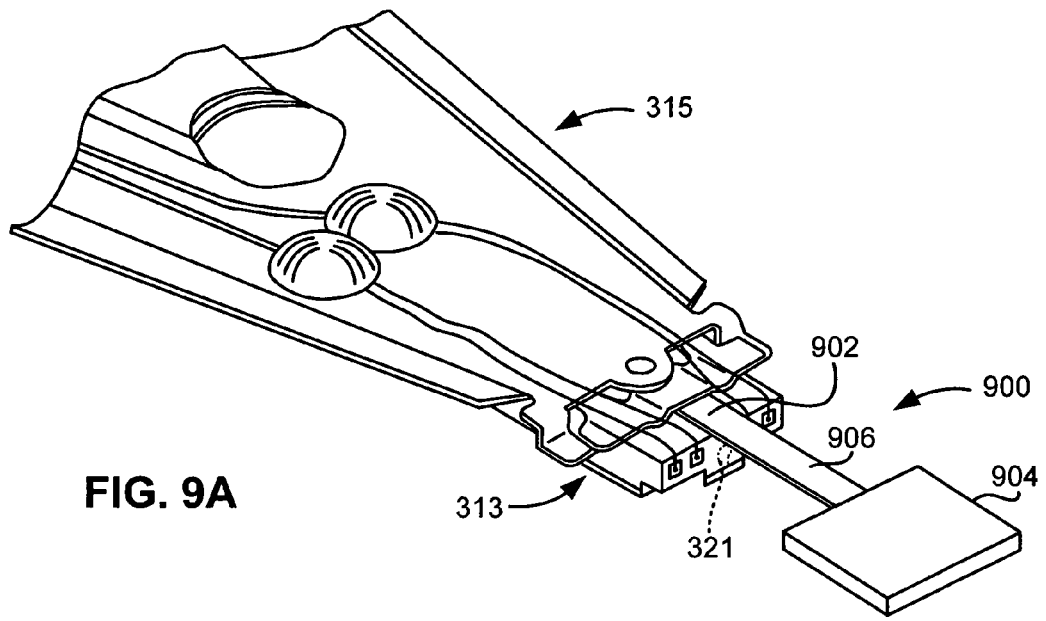
FIG. 9A is a perspective view of a vibration absorber according to one embodiment.

As mentioned above, the suspension 315 provides a slight spring force which biases the slider 313 against the disk surface 322. When the slider 313 comes in contact with the disk 312, the slider 313 bounces and may begin to oscillate. The impact and/or consequent oscillation can result in an off track motion as well as vertical oscillations that result in flying height variations. As shown in FIG. 9A, to reduce, and sometimes virtually eliminate vertical flying height variations and possible resulting off track motion, the present invention implements a vibration absorber 900 coupled to the slider 313. The vibration absorber 900 counters the mechanical energy created by the slider-disk contact, minimizing the resultant mechanical vibration.

With continued reference to FIG. 9A, the vibration absorber 900 preferably includes a coupling portion 902 operatively coupled to the slider, and a weight 904 coupled to the coupling portion by a resiliently deformable flexure member 906. In one exemplary embodiment, the deformable flexure member 906 is a beam with a mass at its end forming the weight 904. A cantilever beam plate 902, acting as the coupling portion, is first attached to the slider. The cantilever beam plate 902, deformable flexure member 906, and the mass 904 can be all fabricated from individual components, as a single piece, etc. When the slider 313 vibrates, the flexure member 906 and weight 904 act as a vibration absorber 900. The material selection and geometry of the flexure member 906 and weight 904 are chosen as to tune the natural frequency to absorb the vibration of the slider 313. The vibration absorber 900 is preferably tuned to match a natural frequency of vibration of the slider 313 when the slider is in a flying state.

Figure 9B:
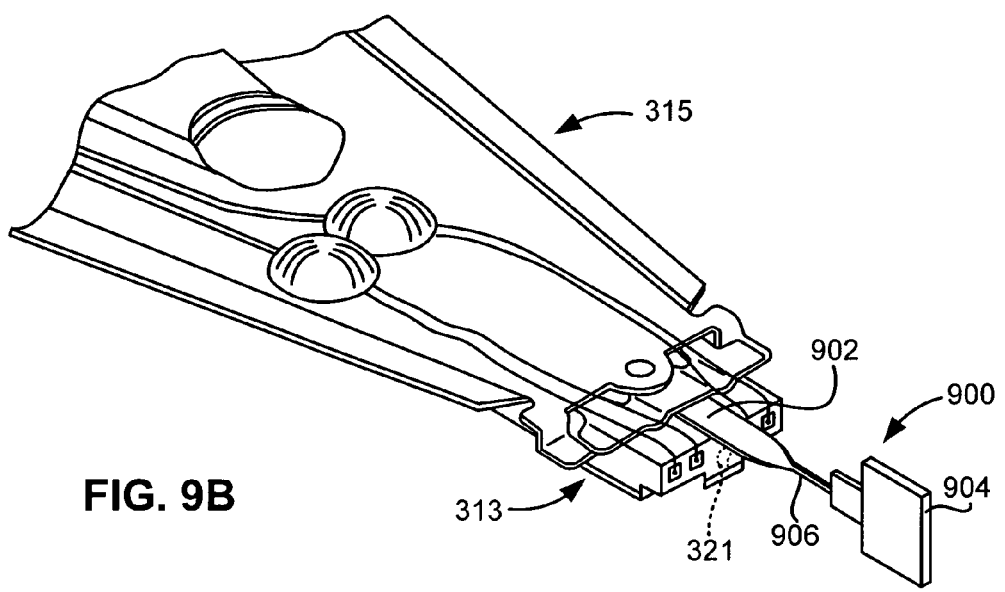
FIG. 9B is a perspective view of a vibration absorber according to another embodiment.

As shown in FIG. 9B, the flexure member 906 can be rotated about 90 degrees from the ABS plane of the slider 313 to allow it to pivot generally along the plane of the ABS of the slider 313, which in turn allows the weight 904 to counter oscillations in the off-track direction. Note that the weight 904 may also be rotated 90 degrees as shown in FIG. 9B, may remain relatively parallel to the ABS of the slider 313, or may be oriented at any angle therebetween. Also note that the angled flexure member 906 can be used in combination with any other configuration described herein to reduce both off track motion and vertical oscillations. Note FIG. 11B, below.

Figure 10A:
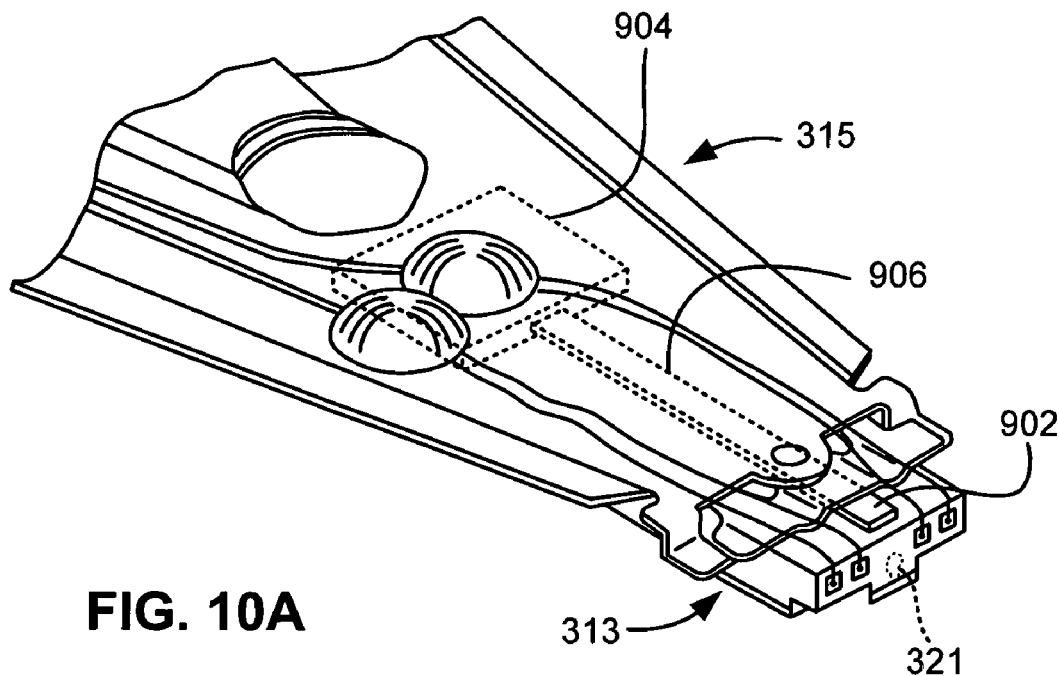
FIGS. 10A–B are perspective views of a vibration absorber according to one embodiment.
Figure 10B:
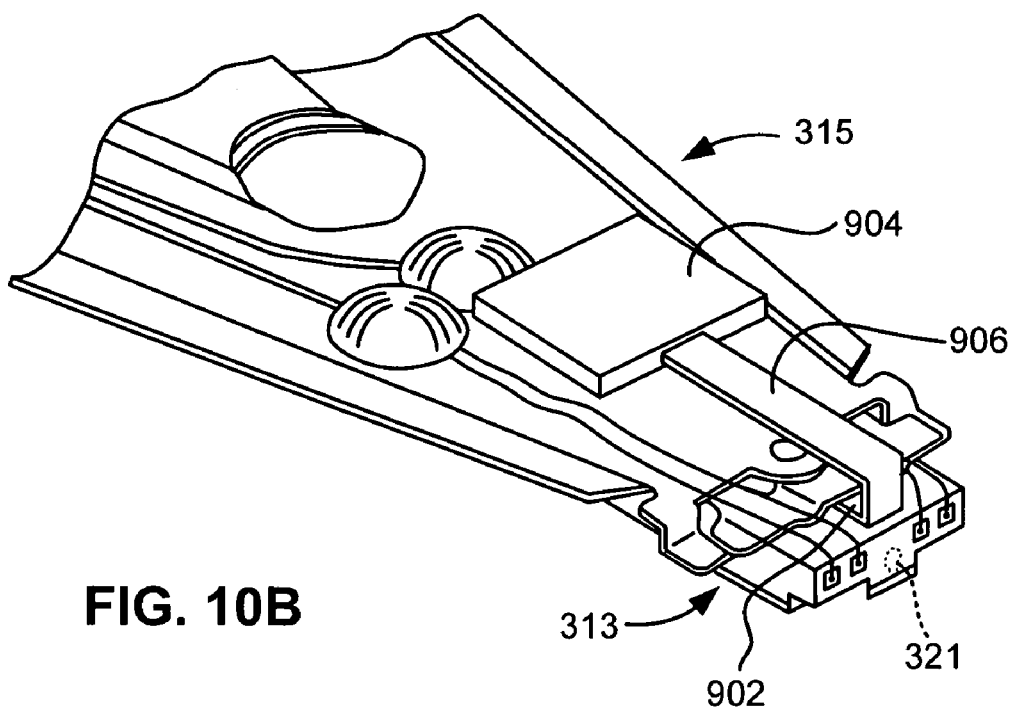
Figure 11A:
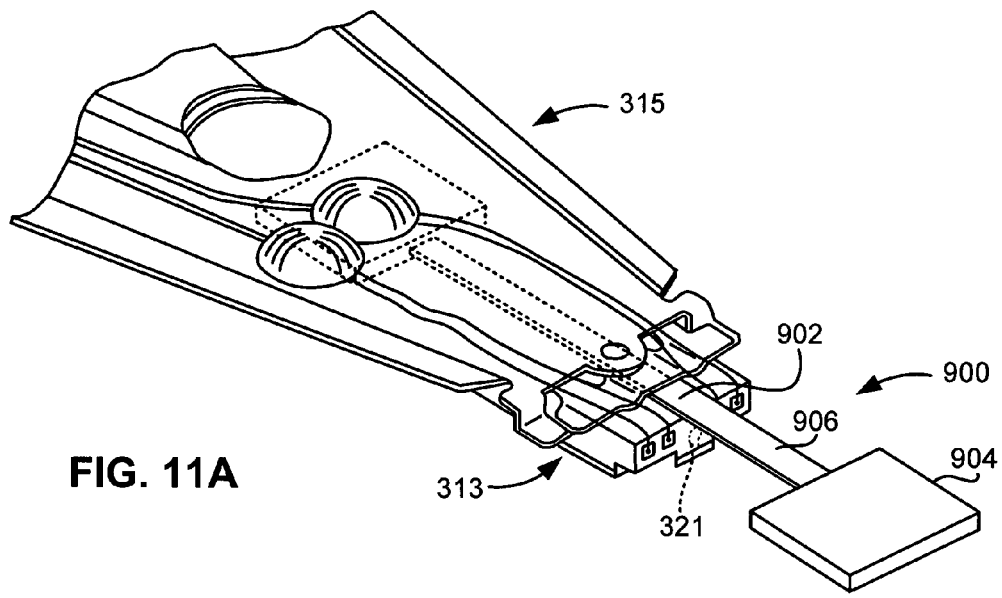
FIG. 11A is a perspective view of a vibration absorber according to one embodiment.
Figure 11B:
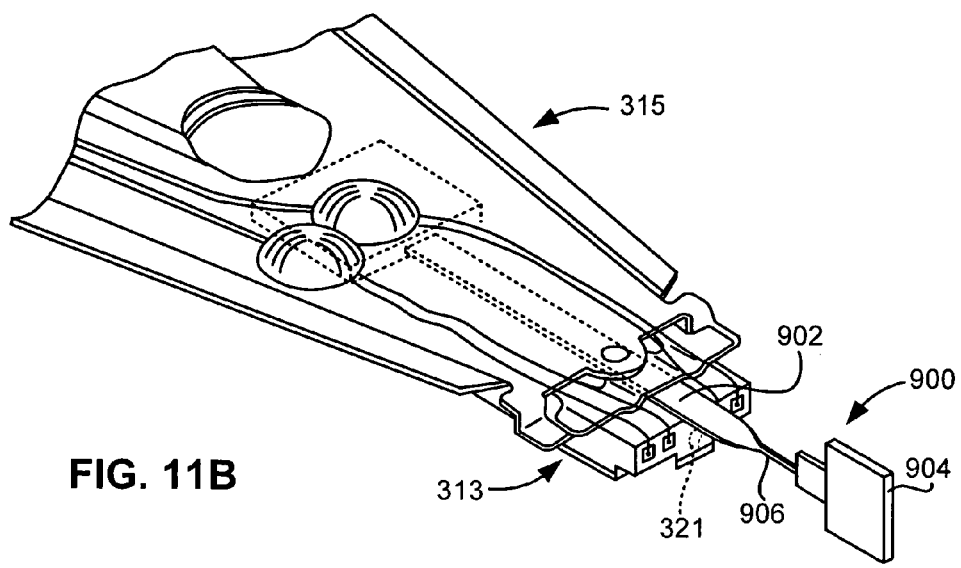
FIG. 11B is a perspective view of a vibration absorber according to one embodiment.
Figure 12:
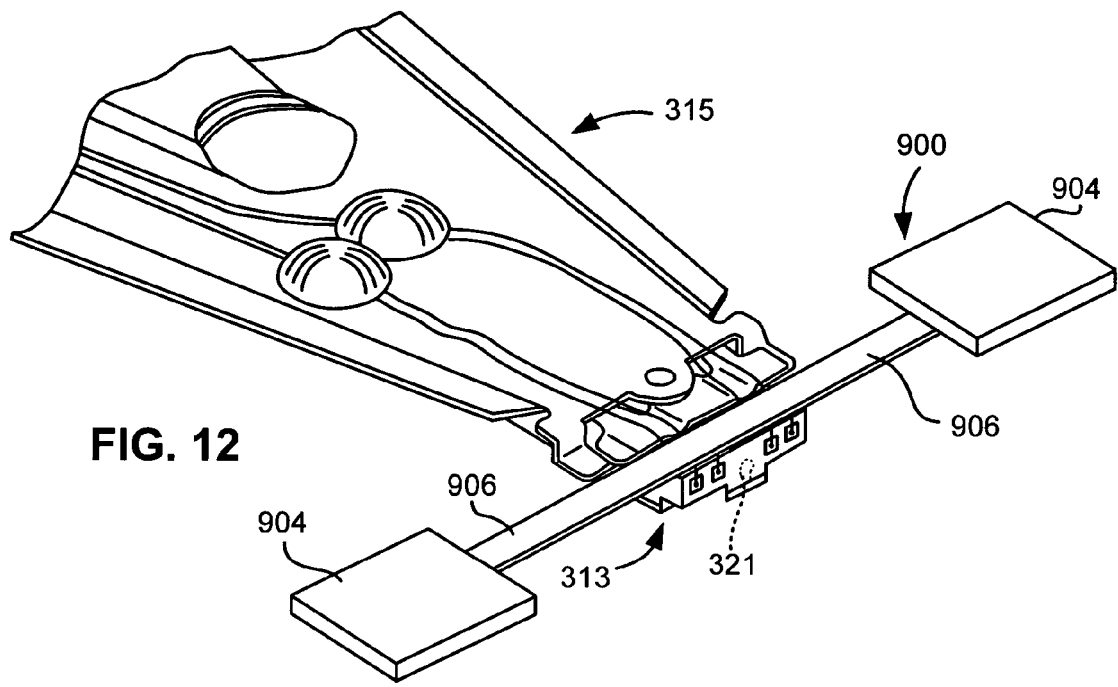
FIG. 12 is a perspective view of a vibration absorber according to one embodiment.

The weight 904 is preferably positioned towards a trailing edge of the slider 313, as shown in FIG. 9A, but can be positioned towards a leading edge of the slider 313 as shown in FIGS. 10A and 10B. FIG. 10A shows the weight 904 positioned below the suspension 315, while FIG. 10B shows the weight 904 positioned above the suspension 315. In other embodiments, a second weight is coupled to the coupling portion of the vibration absorber. In these embodiments, the first and second weights can be positioned towards the leading and trailing edge of the slider 313 respectively as shown in FIG. 11A. FIG. 11B illustrates a hybrid design for reducing both off track motion and vertical oscillations. The design shown in FIG. 12 (where the weights are placed towards edges of the slider 313 extending between the trailing and leading edges of the slider 313) can be used to counteract undesirable roll motions. Note that the coupling portion 902 of the vibration absorber 900 is placed between the slider and the flexure. Again, it is possible that the vibration absorber is made as an integral part of the flexure member 906.

In any of the embodiments, the suspension absorber 900 can be coupled to the slider 313, or flexure (including the frame 354).

The vibration absorber can be manufactured from microfabrication process, including photolithography, film deposition/etching, and electroplating. Any desired materials having the desired properties, i.e., ability to be adhered to the slider, resiliency, etc., can be used. No particular shape of the vibration absorber is required, though it is preferred that the shape of the weight be such that it does not contact the disk. Thus, a flat shape is preferred where the weight extends from the trailing edge of the slider as shown in FIG. 9. Also, the weight may simply be an extension of or integral to the deformable flexure member. Also, the coupling portion of the vibration absorber can have any desired shape, such as a plate that is sandwiched between the slider and suspension, a U-shape that saddles the slider or suspension, etc. The deformable flexure member can be a beam, a spring, etc.

The physics behind the vibration absorption are described in detail in AN INTRODUCTION TO MECHANICAL VIBRATIONS, Steidel, Robert F., John Wiley & Sons, 280–286 (1979). Portions of that text are reproduced below to enable one skilled in the art to practice the present invention.

Figure 13:
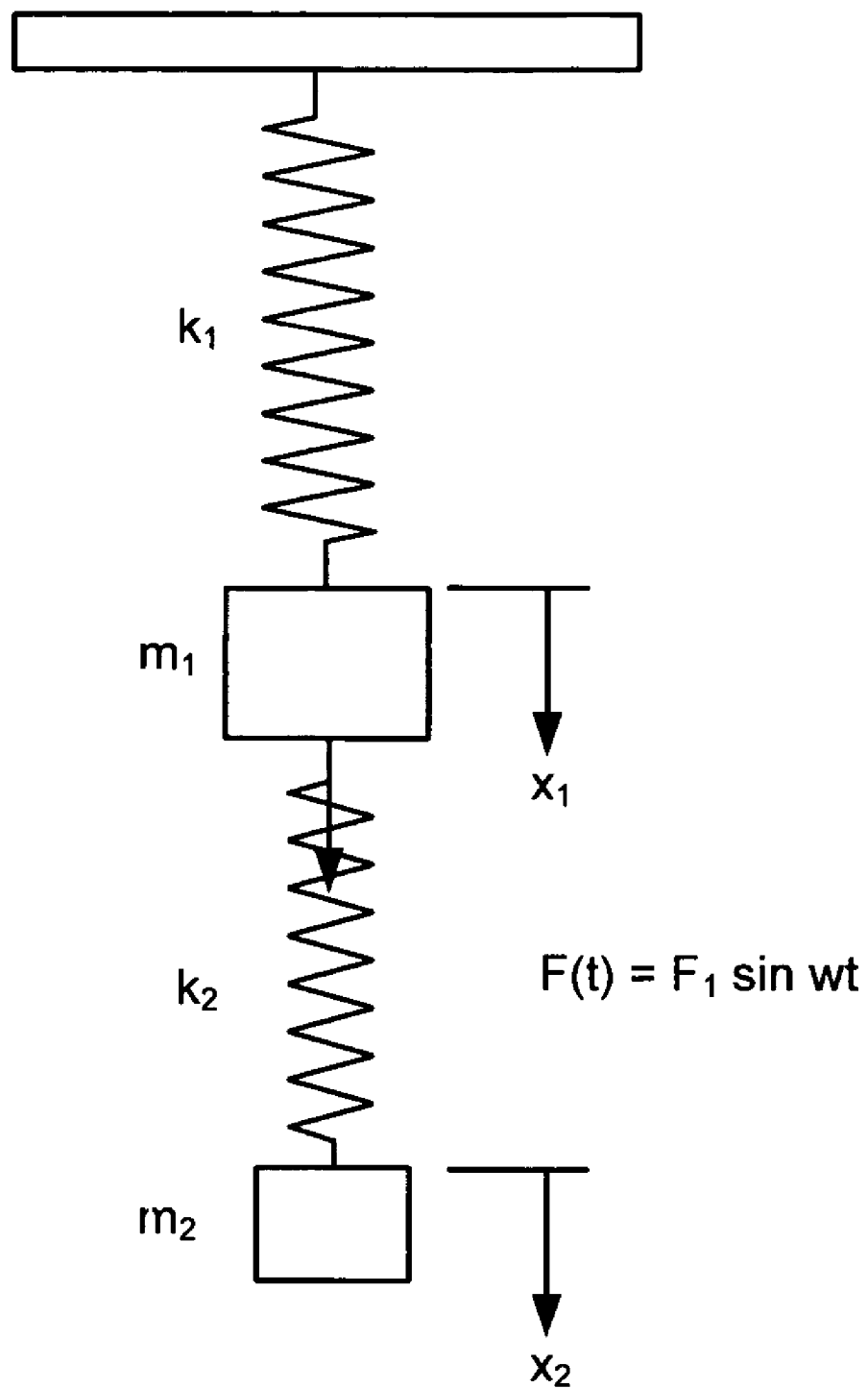
FIG. 13 is a side view of a vibration absorbing apparatus.

In its simplest form, a dynamic vibration absorber consists of one spring and a mass. Such an absorber system is attached to the single degree of freedom system, as shown in FIG. 13. One effect of adding a dynamic vibration absorber is obvious. Its presence adds an additional degree of freedom to the system.

The equations of motion for the main mass and for the absorber are $$-k_1 x_1 + k_2 (x_2 - x_1) + F_1 \sin \omega t = m_1 \ddot{x}_1 \quad \text{Equation 1}$$

$$-k_2 (x_2 - x_1) = m_2 \ddot{x}_2 \quad \text{Equation 2}$$

For this forced excitation, each mass will move with the frequency of the forcing function $\omega$, $x_1 = X_1 \sin \omega t$, $x_2 = X_2 \sin \omega t$.

$$\begin{bmatrix} (k_1 + k_2 - m_1 \omega^2) & -k_2 \\ -k_2 & (k_2 - m_2 \omega^2) \end{bmatrix} \begin{Bmatrix} X_1 \\ X_2 \end{Bmatrix} = \begin{Bmatrix} F_1 \\ 0 \end{Bmatrix} \quad \text{Equation 3}$$

The natural frequencies of the system are the eigenvalues or characteristic roots of the determinant.

$$Det(\omega^2) = (k_1 + k_2 - m_1 \omega^2)(k_2 - m_2 \omega^2) - k_2^2 = 0 \quad \text{Equation 4}$$

and the amplitudes $X_1$ and $X_2$ are $$X_1 = \frac{F_1 (k_2 - m_2 \omega^2)}{(k_1 + k_2 - m_1 \omega^2)(k_2 - m_2 \omega^2) - k_2^2} \quad \text{Equation 5a}$$

$$X_2 = \frac{F_1 k_2}{(k_1 + k_2 - m_1 \omega^2)(k_2 - m_2 \omega^2) - k_2^2} \quad \text{Equation 5b}$$

Both $X_1$ and $X_2$ are determinate, if the magnitude of the forcing function $F(t) = F_1 \sin \omega t$ is known. For simplification, the following substitutions are made:

$$\omega_{11}^2 = \frac{k_1}{m_1}, \text{ the natural frequency of the main system alone}$$

$$\omega_{22}^2 = \frac{k_2}{m_2}, \text{ the natural frequency of the absorber system alone}$$

$$\mu = \frac{m_2}{m_1}, \text{ the mass ratio}$$

$$\frac{k_2}{k_1} = \frac{\omega_{22}^2}{\omega_{11}^2} \mu$$

Solving for $X_1$ and $X_2$ $$X_1 = \frac{F}{k_1} \frac{\left(1 - \frac{\omega^2}{\omega_{22}^2}\right)}{\left[\left(1 + \mu \frac{\omega_{22}^2}{\omega_{11}^2} - \frac{\omega^2}{\omega_{11}^2}\right)\left(1 - \frac{\omega^2}{\omega_{22}^2}\right) - \mu \frac{\omega_{22}^2}{\omega_{11}^2}\right]} \quad \text{Equation 6a}$$

$$X_2 = \frac{F}{k_1} \frac{1}{\left[\left(1 + \mu \frac{\omega_{22}^2}{\omega_{11}^2} - \frac{\omega^2}{\omega_{11}^2}\right)\left(1 - \frac{\omega^2}{\omega_{22}^2}\right) - \mu \frac{\omega_{22}^2}{\omega_{11}^2}\right]} \quad \text{Equation 6b}$$

Figure 14A:
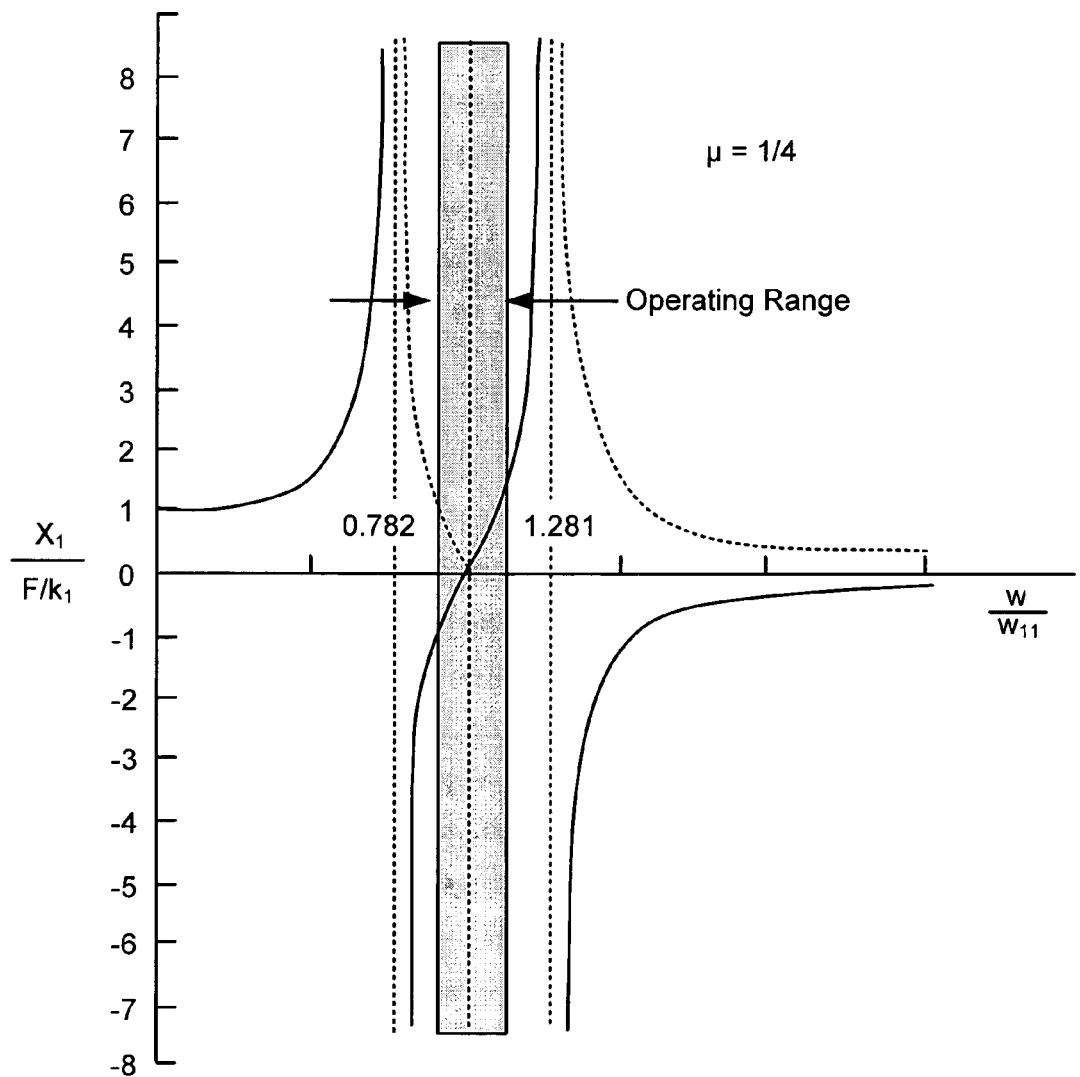
FIGS. 14A–B are graphs illustrating a relationship of displacement of a vibration absorbing apparatus and object coupled thereto and parameter $F_1$ and $k_1$ as set forth in Equations 6a–b.
Figure 14B:
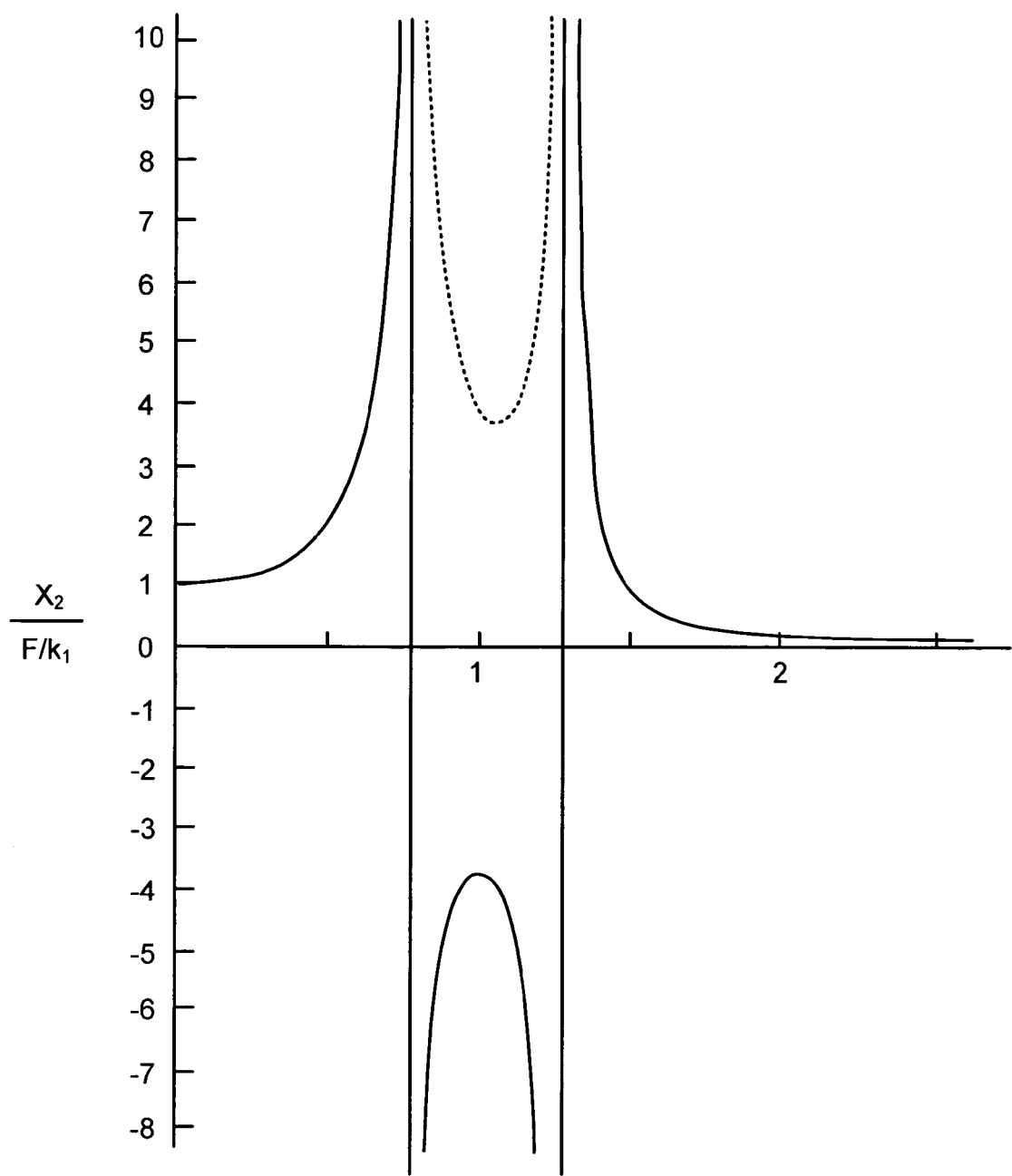

At $\omega = \omega_{22}$, the motion of the main mass m1 does not simply diminish, it ceases altogether. The displacements $X_1$ and $X_2$, as related to the arbitrary parameter $F_1/k_1$, are shown in FIGS. 14a and 14b. The mass ratio $\mu = \frac{1}{4}$, and $\omega_{11} = \omega_{22}$, the absorber being tuned to the natural frequency of the main system. The satisfactory operating range where $X/(F/k_1) < 1$ is shaded.

Two parameters can be varied. One is the mass ratio $\mu$. Obviously a large mass ratio presents a practical problem. An absorber system that matches the original system in size is not a good solution to any vibration problem. At the same time, the smaller the mass ratio, the narrower will be the operating band of the absorber. The second parameter is the frequency ratio $\beta = \omega_{22}/\omega_{11}$. The natural frequency of the absorber system $\omega_{22}$, is the frequency at which $X_1 = 0$. It should be selected to best satisfy the operating requirements. It is not necessarily equal to $\omega_{11}$, although the use of a vibration absorber is most warranted when the forcing frequency is close to the natural frequency of the main system, and operating restrictions make it impossible to vary either one.

One disadvantage of the dynamic vibration absorber has already been mentioned. It does add an additional degree of freedom. To find the new natural frequencies of the main system and the absorber, one can go back to the frequency equation 3. Setting $\beta = \omega_{22}/\omega_{11}$, for $Det(\omega^2) = 0$, $$\left(1 + \mu \beta^2 - \frac{\omega^2}{\omega_{11}^2}\right)\left(1 - \frac{\omega^2}{\omega_{22}^2}\right) - \mu \beta^2 = 0 \quad \text{Equation 7a}$$

$$\beta^2 \left(\frac{\omega^4}{\omega_{22}^4}\right) - \frac{\omega^2}{\omega_{22}^2}[1 + \beta^2(1 + \mu)] + 1 = 0 \quad \text{Equation 7b}$$

This is the frequency equation expressed in terms of the two parameters $\mu$ and $\beta$.

For $\omega_{11} = \omega_{22}$, $\beta^2 = 1$, $$\frac{\omega^2}{\omega_{22}^2} = \frac{2 + \mu}{2} \pm \frac{1}{2}\sqrt{(2 + \mu)^2 - 4}$$

Figure 15:
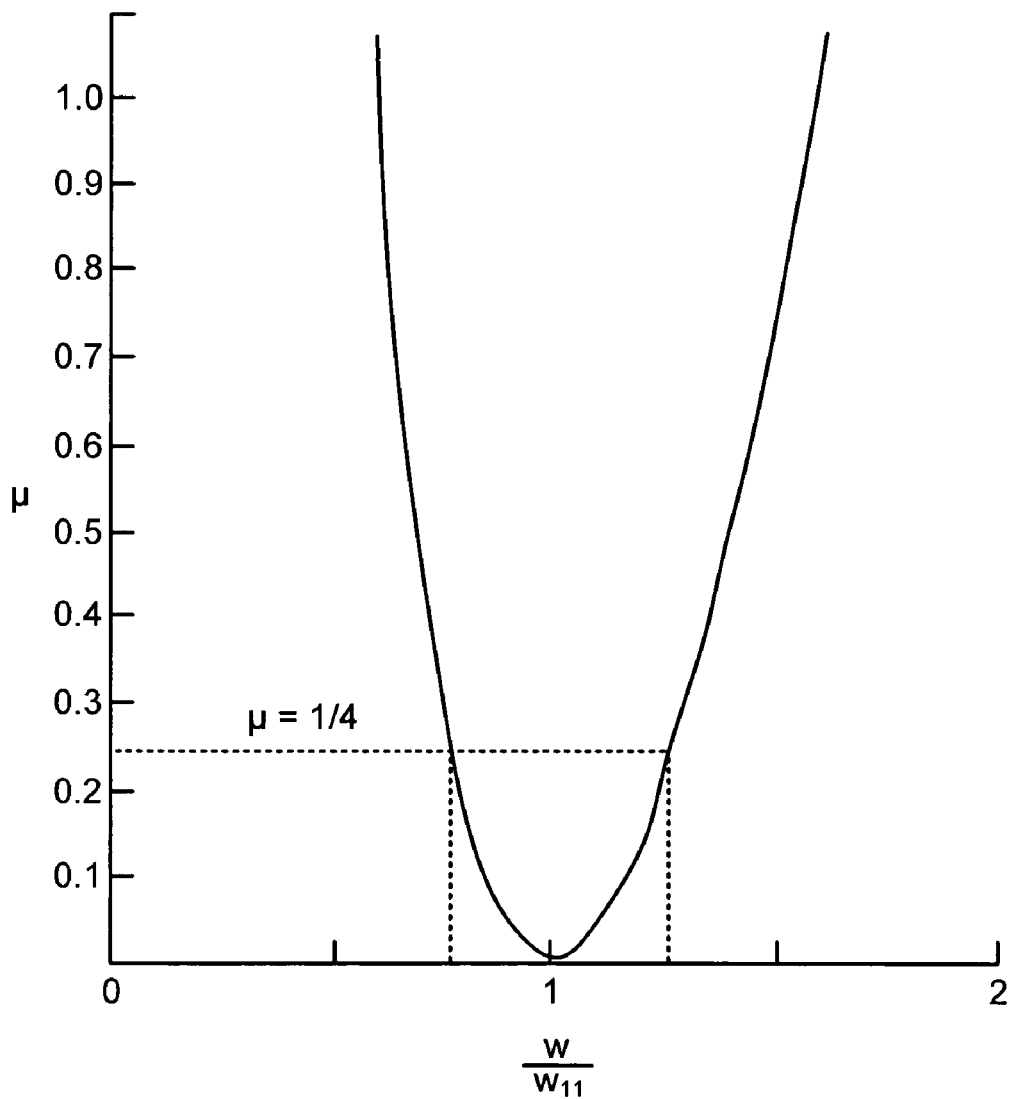
FIG. 15 is a graph illustrating a relationship of frequencies of a vibration absorbing apparatus and object coupled thereto.

The separation of the two natural frequencies, w1 and o, is depicted in FIG. 15. For a mass ratio of $\mu=\frac{1}{4}$, the two natural frequencies $\omega_1$ and $\omega_2$ are $\omega_1=0.782\omega_{11}$ and $\omega_{22}=1.281\omega_{11}$. As the mass ratio increases, the separation of the two natural frequencies increases.

If damping is added to the absorber system, the amplitude of both X1 and X2 at resonance are diminished, but not equally. Unfortunately, the lower natural frequency is diminished less than the higher natural frequency, and it is the lower natural frequency which must be passed through in order to reach operating speed. To equalize the maximum amplitudes at resonance, the damped absorber is tuned to a frequency slightly lower than the natural frequency of the main system. Optimum tuning is defined as the ratio $\omega_{22}/\omega_{11}$, when the resonant amplitudes are equal. A derivation of the optimum tuning can be found in the vibration books of both S. Timoshenko and J. P. Den Hartog. It suffices here to state the result that at optimum tuning, $$\beta = \frac{\omega_{22}}{\omega_{11}} = \frac{1}{1+\mu} \qquad \text{Equation 8}$$

Damping can also be optimized. If it is absent, the amplitude of the main system will be zero at the tuning frequency, $\omega=\omega_{22}$. With damping, the resonant amplitudes of the combined system are diminished but the minimum amplitude of the main system is no longer zero at the tuning frequency. Optimum damping is defined as that amount of damping which will make the response curve nearly flat between the two natural frequencies $\omega_1$ and $\omega_2$. The resonant amplitudes are decreased and the amplitude at the tuning frequency is increased.

If vibration absorbers are used, they are more often used without damping. Damping defeats the purpose of an absorber, which is to eliminate unwanted vibration, and is only warranted if the frequency band in which an absorber is effective is too narrow for operation.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A slider assembly comprising:
   a slider having a magnetic head for reading and/or writing to a storage medium; and
   a vibration absorber operatively coupled to the slider for reducing mechanical vibrations of the slider caused by contact of the slider with the storage medium,
   wherein the vibration absorber includes a coupling portion coupled to the slider, and a weight coupled to the coupling portion by a resiliently deformable flexure member,
   wherein the flexure member forms a cantilever supporting the weight.

2. A slider assembly as recited in claim 1, wherein the weight has a generally flat profile, wherein a plane of the weight along the profile is oriented at an angle with respect to an air bearing surface of the slider, the angle being greater than 0°.

3. A slider assembly as recited in claim 1, the weight being spaced from the coupling portion, the weight only being coupled to the coupling portion by the flexure member.

4. A slider assembly as recited in claim 1, wherein the weight is positioned at least one of towards a trailing edge of the slider and towards a leading edge of the slider.

5. A slider assembly as recited in claim 1, further comprising a second weight coupled to the coupling portion.

6. A slider assembly as recited in claim 5, wherein the weight and second weight are positioned towards a leading and trailing edge of the slider, respectively.

7. A slider assembly as recited in claim 5, wherein the weight and second weight are positioned towards opposite edges of the slider, the opposite edges extending between trailing and leading edges of the slider.

8. A slider assembly as recited in claim 1, wherein a pivot axis of the flexure member is about parallel to an air bearing surface of the slider.

9. A slider assembly, comprising:
   a slider having a magnetic head for reading and/or writing to a storage medium; and
   a vibration absorber operatively coupled to the slider for reducing mechanical vibrations of the slider caused by contact of the slider with the storage medium, the vibration absorber including a weight supported by a cantilever,
   wherein the weight has a generally flat profile, wherein a plane of the weight along the profile is oriented at an angle with respect to a plane lying along an air bearing surface of the slider, the angle being greater than 0°.

10. A slider assembly as recited in claim 1, wherein the flexure member allows the weight to twist about an axis of the flexure member.

11. A slider assembly as recited in claim 1, wherein the weight is an integral part of the flexure member.

12. A slider assembly as recited in claim 1, wherein the vibration absorber is tuned to about match a natural frequency of vibration of the slider when the slider is in a flying state.

13. A slider assembly as recited in claim 1, wherein the vibration absorber is damped.

14. A slider assembly as recited in claim 13, wherein the damped vibration absorber is tuned to a frequency lower than a natural frequency of vibration of the slider when the slider is in a flying state.

15. A magnetic storage system, comprising:
   a magnetic disk;
   at least one head for reading from and writing to the magnetic disk;
   a slider for supporting the head;
   an actuator arm and suspension for supporting the slider;
   a vibration absorber for reducing mechanical vibrations of the slider caused by contact of the slider with the magnetic media, wherein the vibration absorber includes a weight supported by a cantilever; and
   a control unit coupled to the head for controlling operation of the head.

16. A magnetic storage system as recited in claim 15, wherein the vibration absorber is coupled to the slider.

17. A magnetic storage system as recited in claim 15, wherein the vibration absorber is coupled to the suspension.

18. A magnetic storage system as recited in claim 15, wherein the vibration absorber is coupled to the actuator arm.

19. A magnetic storage system as recited in claim 15, wherein wherein the flexure member forms a cantilever supporting the weight.

20. A magnetic storage system as recited in claim 19, the weight being spaced from the coupling portion, the weight only being coupled to the coupling portion by the flexure member.

21. A magnetic storage system as recited in claim 19, wherein the weight is positioned towards at least one of a trailing edge of the slider and a leading edge of the slider.

22. A magnetic storage system as recited in claim 19, further comprising a second weight coupled to the coupling portion.

23. A magnetic storage system as recited in claim 22, wherein the weight and second weight are positioned towards a leading and trailing edge of the slider, respectively.

24. A magnetic storage system as recited in claim 22, wherein the weight and second weight are positioned towards opposite edges of the slider, the opposite edges extending between trailing and leading edges of the slider.

25. A magnetic storage system as recited in claim 19, wherein a pivot axis of the flexure member is about parallel to an air bearing surface of the slider.

26. A magnetic storage system as recited in claim 19, wherein the weight has a flat profile wherein a plane of the weight along the profile is oriented at an angle with respect to a plane lying along an air bearing surface of the slider, the angle being greater than 0°.

27. A magnetic storage system as recited in claim 19, wherein the weight is an integral part of the flexure member.

28. A magnetic storage system as recited in claim 15, wherein the vibration absorber is tuned to about match a natural frequency of vibration of the slider when the slider is in a flying state.

29. A magnetic storage system as recited in claim 15, wherein the vibration absorber is damped.

30. A magnetic storage system as recited in claim 29, wherein the damped vibration absorber is tuned to a frequency lower than a natural frequency of vibration of the slider when the slider is in a flying state.

31. A magnetic storage system, comprising:

a magnetic disk;

at least one head for reading from and writing to the magnetic disk;

a slider for supporting the head;

an actuator arm and suspension for supporting the slider;

a vibration absorber for reducing mechanical vibrations of the slider caused by contact of the slider with the magnetic media; wherein the vibration absorber includes a coupling portion operatively coupled to the slider, and a weight coupled to the coupling portion by a resiliently deformable flexure member, the flexure member forming a cantilever supporting the weight; and a control unit coupled to the head for controlling operation of the head.

32. A magnetic storage system as recited in claim 31, wherein the weight is positioned towards a trailing edge of the slider, the weight being spaced from the coupling portion, the weight only being coupled to the coupling portion by the flexure member.

* * * * *

UNITED STATES PATENT AND TRADEMARK OFFICE
CERTIFICATE OF CORRECTION

| | | |
|---|---|---|
| PATENT NO. | : 7,236,330 B2 | Page 1 of 1 |
| APPLICATION NO. | : 10/777533 | |
| DATED | : June 26, 2007 | |
| INVENTOR(S) | : Suk | |

It is certified that error appears in the above-identified patent and that said Letters Patent is hereby corrected as shown below:

On the Title page:
section (74) Attorney, Agent, or Firm, change "Zikla-Kotab, PC" to --Zilka-Kotab, PC--.

Signed and Sealed this

Twenty-first Day of August, 2007

JON W. DUDAS
*Director of the United States Patent and Trademark Office*